(12) United States Patent
Du et al.

(10) Patent No.: US 8,508,479 B2
(45) Date of Patent: Aug. 13, 2013

(54) COMPUTER MOUSE

(75) Inventors: Wei Du, Shenzhen (CN); Ming-Chang Lee, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 682 days.

(21) Appl. No.: 12/770,754

(22) Filed: Apr. 30, 2010

(65) Prior Publication Data

US 2011/0141018 A1 Jun. 16, 2011

(30) Foreign Application Priority Data

Dec. 16, 2009 (CN) .......................... 2009 1 0311627

(51) Int. Cl.
*G09G 5/08* (2006.01)

(52) U.S. Cl.
USPC .......................................... 345/163; 345/156

(58) Field of Classification Search
USPC .................................................. 345/156–173
See application file for complete search history.

(56) References Cited

U.S. PATENT DOCUMENTS

| 6,525,280 | B2 * | 2/2003 | Chan et al. ..................... 200/6 A |
| 7,625,286 | B2 * | 12/2009 | Hamada ........................... 463/37 |
| 2002/0196234 | A1 * | 12/2002 | Gray ............................. 345/163 |
| 2006/0038786 | A1 * | 2/2006 | Adan et al. ..................... 345/163 |
| 2006/0250353 | A1 * | 11/2006 | Yasutake ....................... 345/156 |
| 2007/0188455 | A1 * | 8/2007 | O'Connell et al. ........... 345/163 |
| 2008/0024447 | A1 * | 1/2008 | Hsieh et al. .................... 345/163 |

FOREIGN PATENT DOCUMENTS

CN 101299170 A 11/2008

* cited by examiner

*Primary Examiner* — Viet Pham
(74) *Attorney, Agent, or Firm* — Altis Law Group, Inc.

(57) ABSTRACT

A computer mouse includes an upper shell, and a first button pivotably mounted to a side of the upper shell. The first button is operable of pivoting inwards relative to the shell to activate the function of a first key of a keyboard.

13 Claims, 7 Drawing Sheets

COMPUTER MOUSE

BACKGROUND

1. Technical Field

The present disclosure relates to a computer mouse.

2. Description of Related Art

Many kinds of software, such as the Pro/ENGINEER software, require operation of buttons on a keyboard and use of a mouse at the same time, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
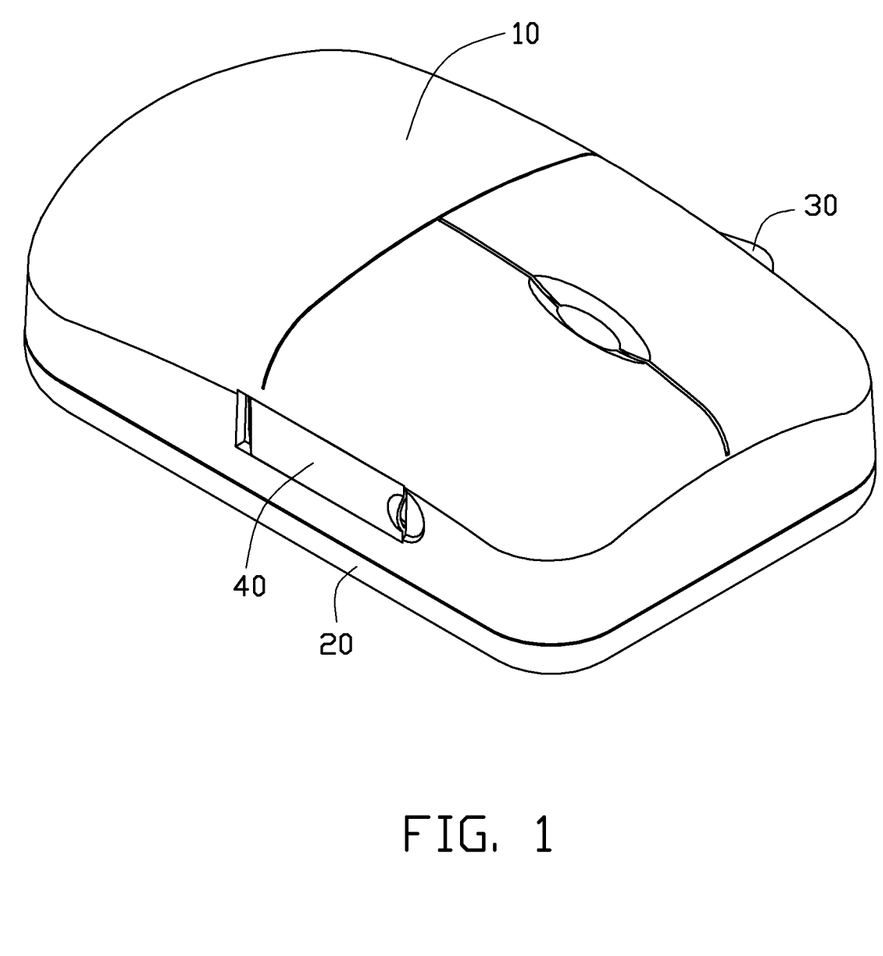
FIG. 1 is an assembled, isometric view of an exemplary embodiment of a computer mouse.

Referring to FIG. 1, an exemplary embodiment of a computer mouse includes an upper shell 10, a lower shell 20 mounted to a bottom of the upper shell 10, a first button 30, and a second button 40.

Figure 2:
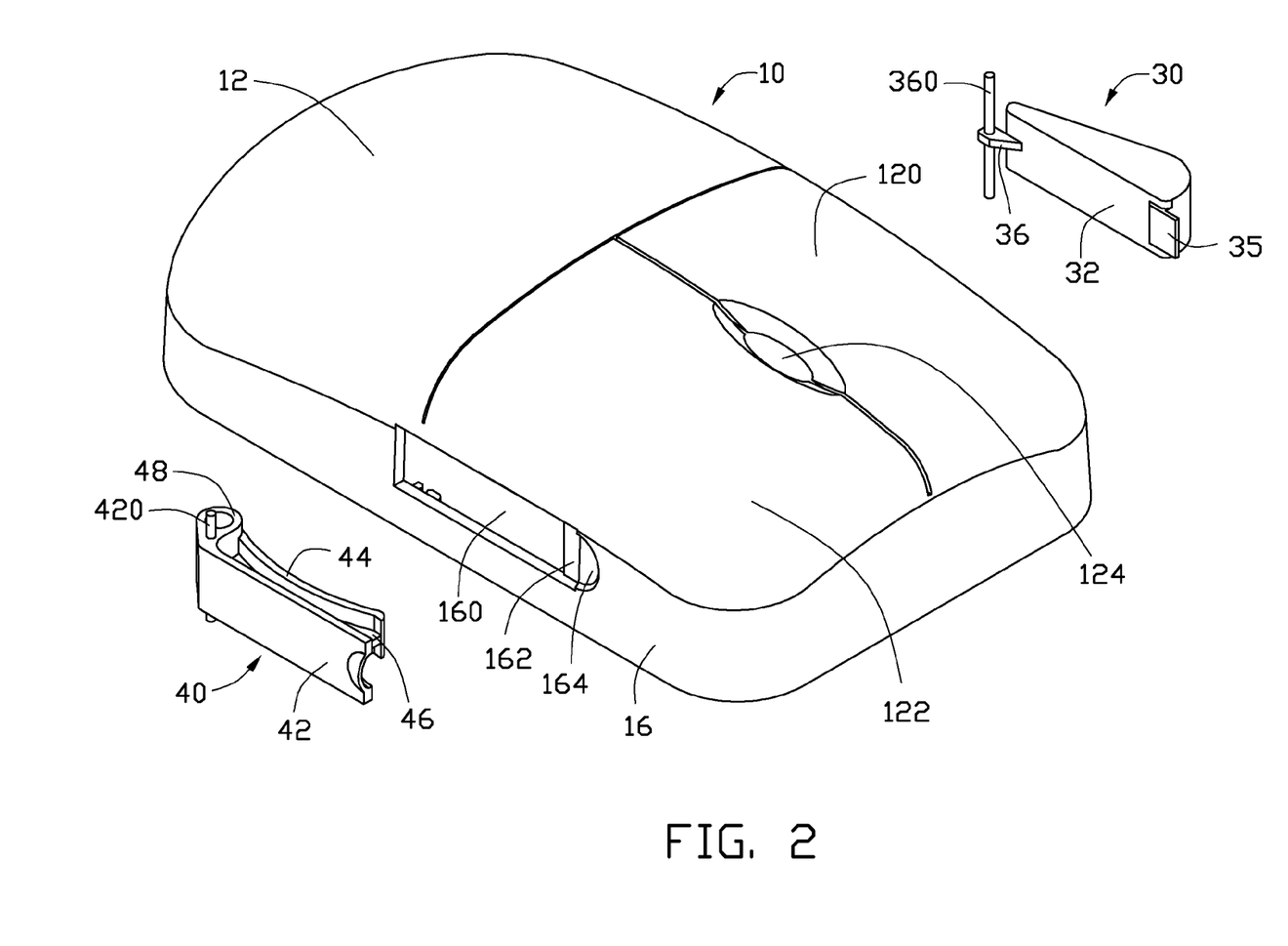
FIG. 2 is an exploded, isometric view of the mouse of FIG. 1, with a lower shell omitted.
Figure 3:
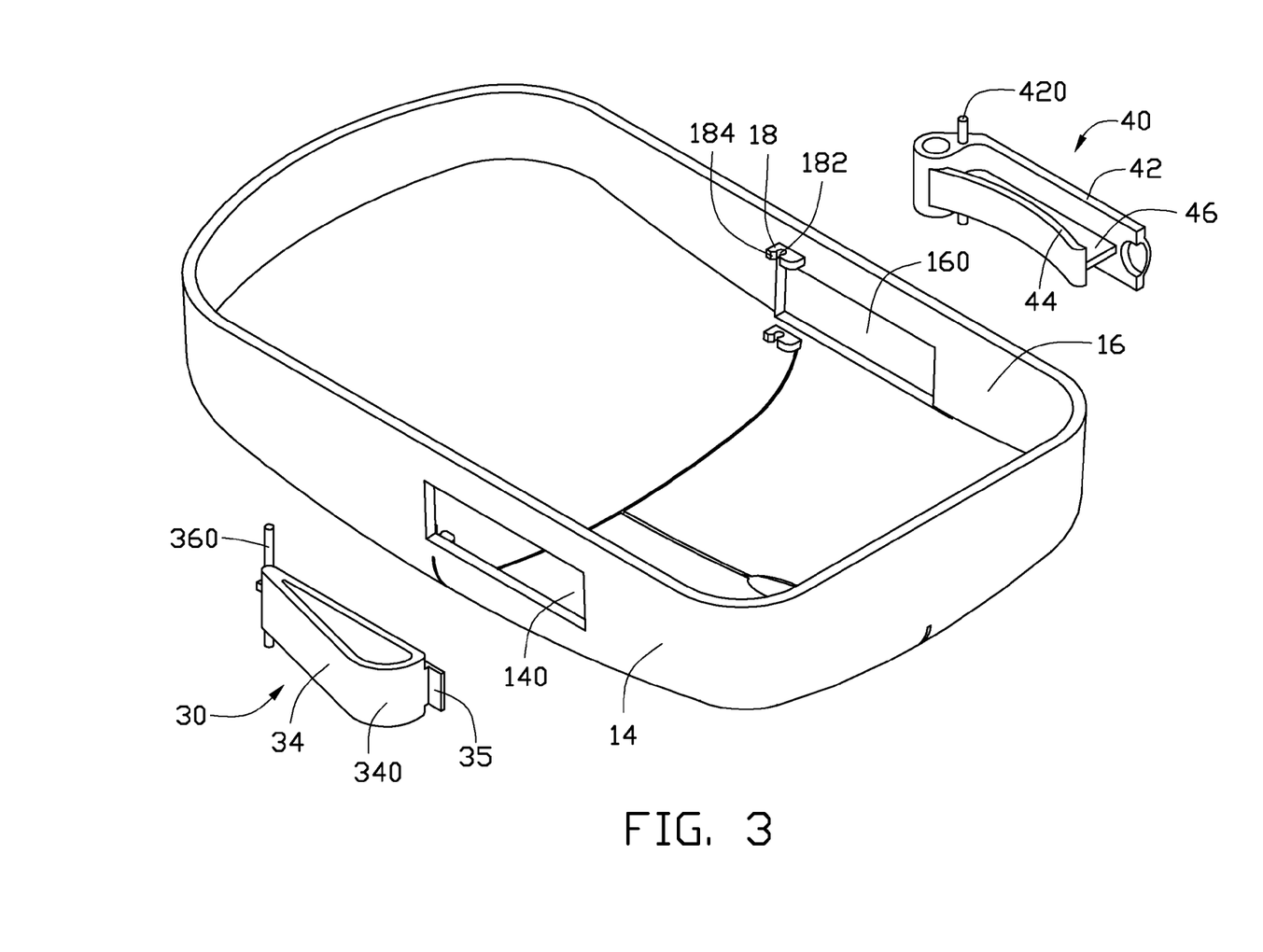
FIG. 3 is an inverted view of the mouse of FIG. 2.
Figure 4:
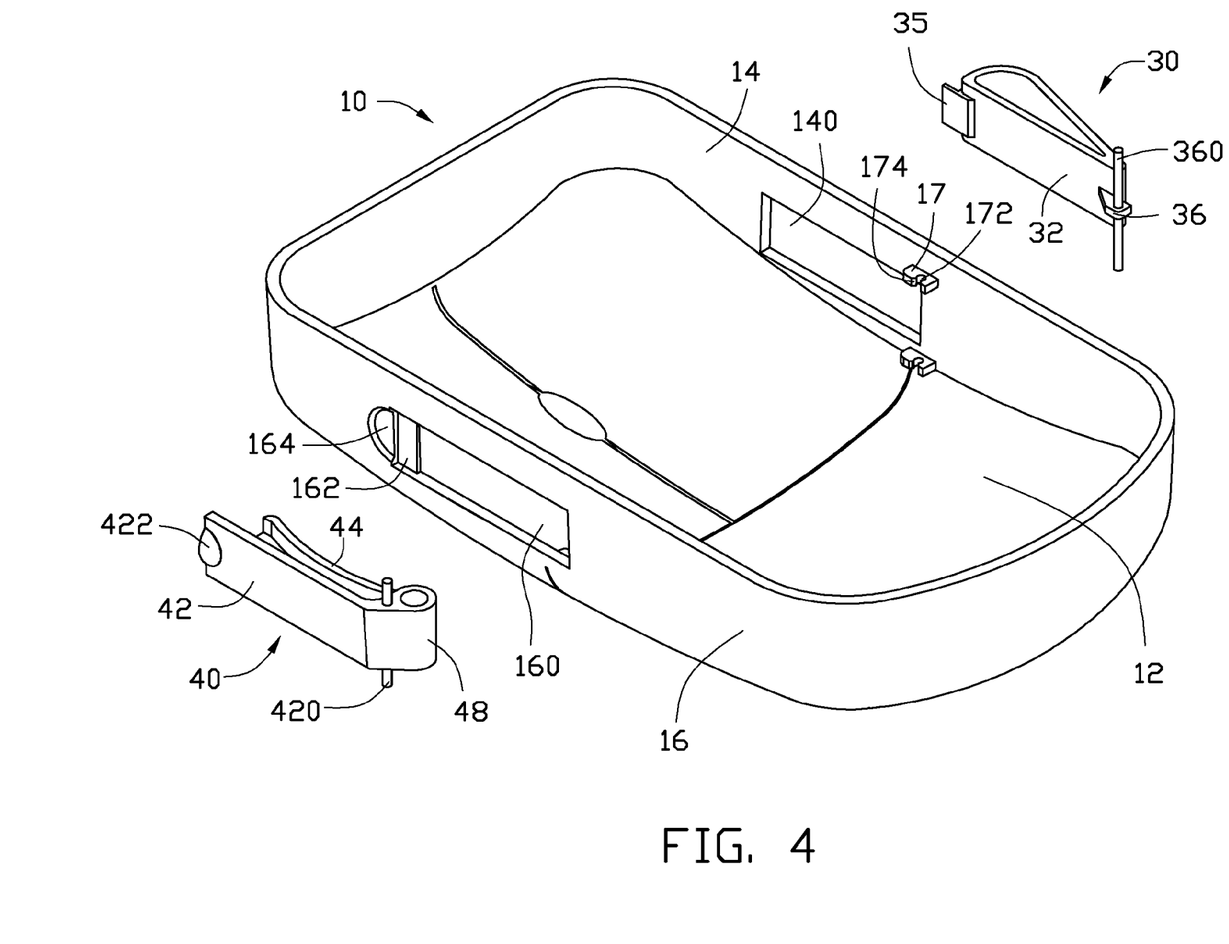
FIG. 4 is similar to FIG. 3, but viewed from another perspective.

Referring to FIGS. 2 to 4, the upper shell 10 includes an arc-shaped top plate 12, a first side plate 14 extending down from a first side of the top plate 12, and a second side plate 16 extending down from a second side of the top plate 12 opposite to the first side. Mounted on the top plate 12 are a right mechanical button 122, a left mechanical button 120, and a scrolling wheel 124 between the right mechanical button 122 and the left mechanical button 120, at a front end of the top plate 12.

The first side plate 14 defines an opening 140 therein, adjacent to a front end of the first side plate 14. Two first blocks 17 protrude from an inner surface of the first side plate 14, at top and bottom sides of a rear end of the opening 140. Each first block 17 defines a C-shaped first pivot slot 172. Two slanted guiding surfaces 174 are formed at opposite sides bounding an opening of the first pivot slot 172. The second side plate 16 defines an opening 160 therein, adjacent to a front end of the second side plate 16. Two second blocks 18 protrude from an inner surface of the second plate 16, at top and bottom sides of a rear end of the opening 180. Each second block 18 defines a C-shaped second pivot slot 182. Two slanted guiding surfaces 184 are formed at opposite sides bounding an opening of the second pivot slot 182. An inset bar-shaped portion 162 is formed in a front end of the opening 160. A depressed semicircular avoiding groove 16 is defined in the second side plate 16, adjacent to the front end of the opening 160.

The first button 30 includes a flat base plate 32 and an arc-shaped side plate 34. The base plate 32 includes a front end and a rear end opposite to the front end. The side plate 34 is connected to the front end and the rear end. A distance between the base plate 32 and the side plate 34 gradually increases from the rear end towards the front end, thereby the side plate 34 forms a raised portion 340, adjacent to the front end. A connecting block 36 extends from the rear end of the base plate 32. Mounted on the connecting block 36 is a pivot post 360 parallel to the base plate 32. An obstructing tongue 35 protrudes from the front end of the base plate 32, away from the rear end of the base plate 32.

The second button 40 includes a first plate 42, a second plate 44 opposite to the first plate 42, and a supporting plate 46 perpendicularly connected between the first and second plates 42 and 44. The second plate 44 is substantially arc-shaped, and narrower and shorter than the first plate 42. The first plate 42 is longer than the supporting plate 46. An engaging portion 48 is formed at a rear end of the first plate 42. Two posts 420 perpendicularly protrude from top and bottom ends of the engaging portion 48. An arc-shaped operating portion 422 protrudes from a front end of the first plate 42, opposite to the second plate 44.

Figure 5:
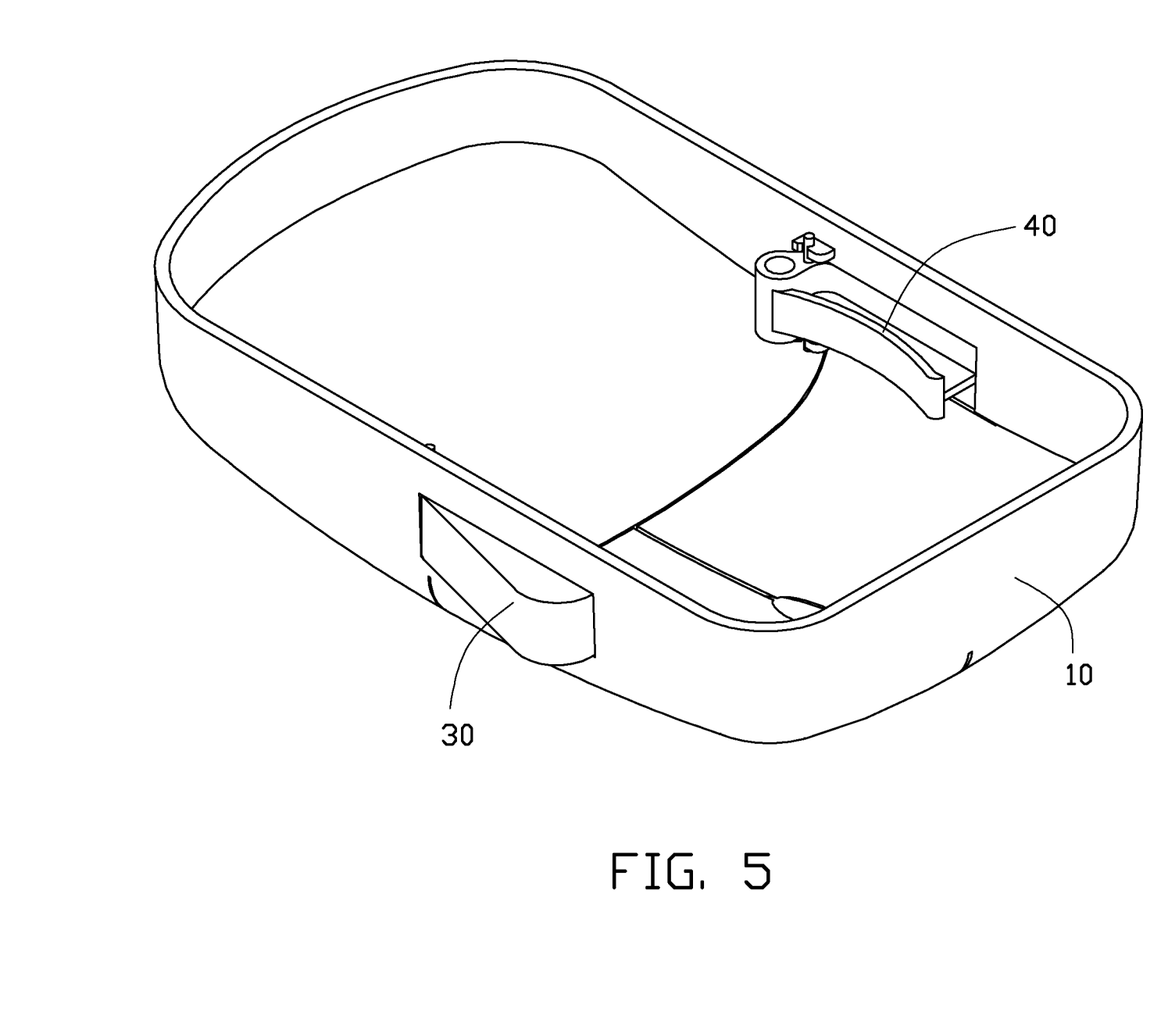
FIG. 5 is an assembled view of the mouse of FIG. 3.

Referring to FIG. 5, in assembly, the first button 30 is accommodated in the upper shell 10, with the side plate 34 exposed from the opening 140 of the first side plate 14. The pivot post 360 of the first button 30 passes through the opening between the guiding surfaces 174 of the first blocks 17, to rotatably engage in the first pivot slots 172 of the first blocks 17. The base plate 32 is located inside the upper shell 10, and the obstructing tongue 35 resists against the inner surface of the first side plate 14. Therefore, the first button 30 rotatably attaches to the first side plate 14 about the pivot post 360. The obstructing tongue 35 can prevent the first button 30 from rotating out of the upper shell 10 through the opening 140, because of engagement between the obstructing tongue 35 and the inner surface of the first side plate 14.

The second button 40 is accommodated in the upper shell 10, with the front end of the first plate 42 exposed from the opening 160. The posts 420 of the second button 40 pass through the opening between the guiding surfaces 184, to rotatably engage in the second pivot slots 182 of the second blocks 18. The second plate 44 is located in the upper shell 10, and the first plate 42 covers the opening 160. The front end of the first plate 42 resists against an outer surface of the inset portion 162 of the second side plate 16. The operating portion 422 faces the avoiding groove 16.

Figure 6:
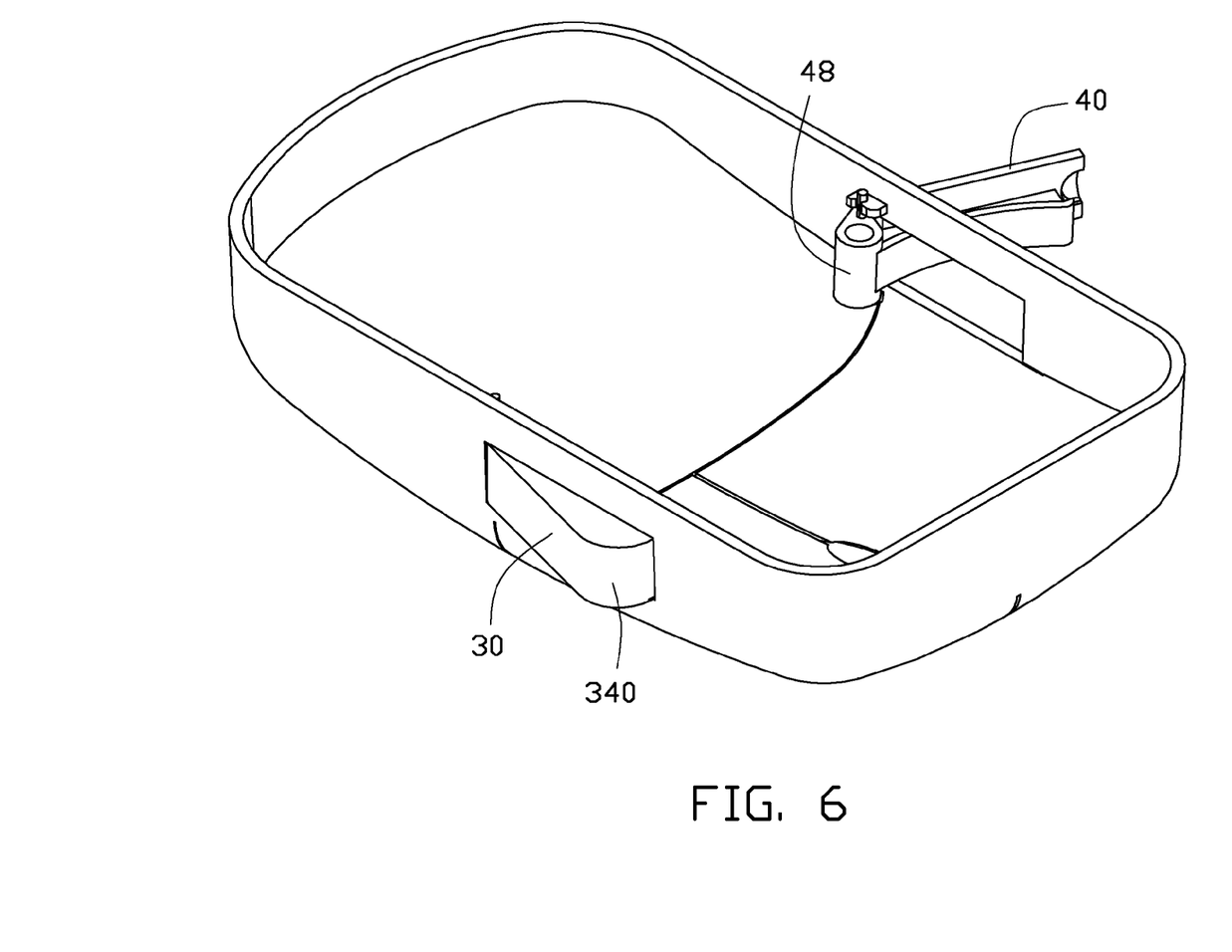
FIG. 6 shows a use state of the mouse of FIG. 5.
Figure 7:
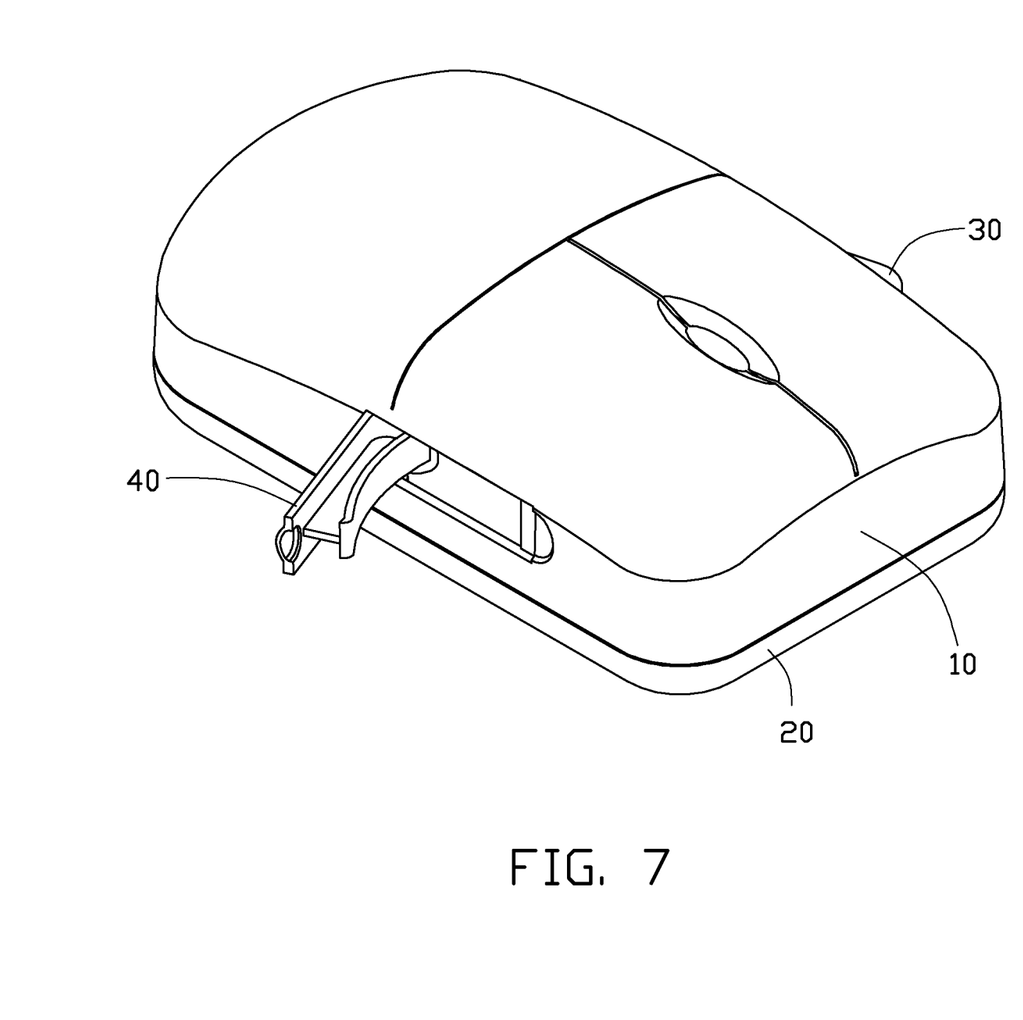
FIG. 7 is an inverted view of the mouse of FIG. 6.

Referring to FIGS. 6 and 7, in use, if a user needs to achieve the function of a shift button of a keyboard, the user can press the raised portion 340 of the first button 30 on the mouse to rotate the first button 30 inwards relative to the upper shell 10, causing the base plate 32 of the first button 30 to press a corresponding inner structure of the mouse to activate the shift button function of the keyboard. If the user needs to achieve the function of a ctrl button of the keyboard, the user can operate the operating portion 422 of the second button 40, to rotate the second button 40 outwards relative to the upper shell 10, causing the engaging portion 48 to rotate inwards relative to the upper shell 10 to press a corresponding inner structure of the mouse to activate the ctrl button function of the keyboard.

In other embodiments, the structure of the second plate 16 is the same as the structure of the first plate 14, correspondingly two first buttons 30 respectively attach to the second plate 16 and the first plate 14. In use, two first buttons 30 can be operated to rotate inwards relative to the shell 10, the base plates 32 press the corresponding inner structures of the mouse to respectively activate the shift button and the ctrl button functions of the keyboard.

The structure of the first plate 14 can be the same as the structure of the second plate 16, correspondingly two second buttons 40 respectively attach to the second plate 16 and the first plate 14. In use, the buttons are operated to rotate outwards relative to the upper shell 10, causing the engaging portions 48 to press the corresponding inner structures of the mouse to respectively activate the shift button and the ctrl button functions of the keyboard.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer mouse comprising:
    an upper shell;
    a first button pivotably mounted to a side of the upper shell, wherein the first button is operable of pivoting inwards relative to the upper shell to activate a first key function of a keyboard; and
    a second button;
    wherein the upper shell comprises a top plate, a first side plate extends down from a first side of the top plate, and defines a first opening, two first blocks protrude from an inner surface of the first side plate at top and bottom sides of a rear end of the first opening, the first button is pivotably mounted to the two first blocks;
    wherein a second side plate extends down from a second side of the top plate opposite to the first side, the second button comprises a first plate, a second plate opposite to the first plate, and a supporting plate perpendicularly connected between the first and second plates, an engaging portion is formed at a rear end of the first plate, two posts perpendicularly protrude from top and bottom ends of the engaging portion, two second blocks protrude from an inner surface of the second side plate at top and bottom sides of a rear ends of the second opening, the two second blocks each defines a second pivot slot, the two posts rotatably engage in the two second pivot slots;
    wherein the first plate is longer than the second plate, the second plate locates inside the upper shell, the first plate covers the second opening;
    wherein an inset portion is formed in a front end of the second opening, a front end of the first plate resists against an outer surface of the inset portion; and
    wherein a depressed semicircular avoiding groove is defined in the second side plate, adjacent to the inset portion, an operating portion protrudes from a front end of the first plate, and faces the avoiding groove.

2. The computer mouse of claim 1, wherein the first button comprises a base plate, a connecting block extends from a rear end of the base plate, the connecting block mounts a pivot post, the first blocks each defines a first pivot slot, the pivot post rotatably engages in the two first pivot slots.

3. The computer mouse of claim 2, wherein each first pivot slot is C-shaped, two slanted guiding surfaces are formed at opposite sides bounding an opening of the first pivot slot to guide the pivot post to engage in the two first pivot slots.

4. The computer mouse of claim 2, wherein an obstructing tongue protrudes from a front end of the base plate, away from the rear end of the base plate, to engage with the inner surface of the first side plate.

5. The computer mouse of claim 4, wherein the first button further comprises an arch-shaped side plate, connected to the front end and the rear end of the base plate with two ends, a distance between the base plate and the side plate gradually increases from the rear end towards the front end, thereby a raised portion is formed on the side plate, adjacent to the front end.

6. The computer mouse of claim 5, wherein the base plate is located inside the upper shell, the side plate is exposed from the first opening.

7. The computer mouse of claim 1, wherein each second pivot slot is C-shaped, two slanted guiding surfaces are formed at opposite sides bounding an opening of the second pivot slot to guide the posts to engage in the two second pivot slots.

8. The computer mouse of claim 1, further comprising a second button pivotably mounted to a second side of the upper shell opposite to the first side, wherein the second button functions as a second key of the keyboard.

9. The computer mouse of claim 8, wherein a first side plate and a second side plate correspondingly extend down from opposite sides of the top plate, a first end of the first button is pivotably mounted to the first side plate, a second end of the first button opposite to the first end locates in the upper shell, a middle of the first button is exposed from the first side plate, wherein the second button is pivotably mounted to the second side plate, a first end of the second button is located in the upper shell, a second end of the button locates outside the upper shell, a pivot shaft of the second button locates between the first and second ends.

10. The computer mouse of claim 9, wherein the first button comprises a base plate, a connecting block extends from the first end of the base plate, the connecting block pivotably mounted to the first side plate, an obstructing tongue protrudes from the second end of the base plate, away from the rear end of the base plate, to engage with an inner surface of the first side plate.

11. The computer mouse of claim 10, wherein the first button further comprises an arch-shaped side plate, connected to the first end and the second end of the base plate with two ends, a distance between the base plate and the side plate gradually increases from the first end towards the second end, thereby a raised portion is formed on the side plate, adjacent to the second end, to expose through the first side plate.

12. The computer mouse of claim 9, wherein an engaging portion is formed at the first end of the second button, two posts perpendicularly protrude from top and bottom ends of the second button adjacent to the engaging portion, to pivotably engage with the second side plate of the upper shell.

13. A computer mouse comprising:
    an upper shell comprises a top plate, a first side plate extending down from a first side of the top plate, and a second side plate extending down from a second side of the top plate opposite to the first side;
    a first button pivotably mounted to the first side plate of the upper shell, wherein the first button is operable of pivoting inwards relative to the upper shell to activate a first key function of a keyboard; and
    a second button pivotably mounted to the second side plate of the upper shell, wherein the second button is operable of rotating outwards relative to the upper shell to activate a second key function of the keyboard;

wherein the second side plate defines a second opening and a depressed avoiding groove adjacent to the second opening, an engaging portion and an operating portion are formed from opposite ends of the second button, the operating portion faces the avoiding groove, the operating portion is operated to pivot out to make the engaging portion to activate the second key function of the keyboard.

* * * * *